United States Patent [19]
Wachter

[11] Patent Number: 5,688,472
[45] Date of Patent: Nov. 18, 1997

[54] SOLIDS FLUIDIZATION SYSTEM

[75] Inventor: William A. Wachter, Baton Rouge, La.

[73] Assignee: Exxon Research and Engineering Company, Florham Park, N.J.

[21] Appl. No.: 341,785

[22] Filed: Nov. 18, 1994

Related U.S. Application Data

[63] Continuation-in-part of Ser. No. 246,546, May 20, 1994, abandoned.

[51] Int. Cl.[6] .................................................. B01J 8/18
[52] U.S. Cl. .......................... 422/143; 422/139; 422/145; 431/170; 432/15
[58] Field of Search .................................. 422/129, 139, 422/143, 145; 431/170; 432/15, 58

[56] References Cited

U.S. PATENT DOCUMENTS

| | | | |
|---|---|---|---|
| 4,392,942 | 7/1983 | Wallman et al. | 208/410 |
| 4,978,441 | 12/1990 | Buchanan et al. | 208/113 |
| 5,286,451 | 2/1994 | DeSilva et al. | 422/68.1 |
| 5,395,597 | 3/1995 | Buchanan et al. | 422/145 |

OTHER PUBLICATIONS

A.M. Squires, M. Kwauk, A.A. Avidan. "Fluid Beds: At Last, Challenging Two Entrenched Practices." *Science*, Dec. 20, 1985, vol. 230, No. 4732.

D. Geldart. "Types of Gas Fluidization." Powder Technology, 7 (1973) 285–292.

*Primary Examiner*—Christopher Kim
*Attorney, Agent, or Firm*—Henry E. Naylor; James H. Takemoto

[57] ABSTRACT

Disclosed is a system for fluidizing a dense phase bed of solid particles, preferably a dense bed of solid catalyst particles. The system includes a dense bed solids housing, a dense bed solids support within the housing, a fluid injection component which sends fluids toward the solids supported within the housing, and a stuctural component which is capable of decreasing the distance between the dense bed solids support and the fluid injection component as the fluid is sent toward the solids that are supported within the housing.

9 Claims, 4 Drawing Sheets

5,688,472

SOLIDS FLUIDIZATION SYSTEM

This is a continuation in part of U.S. patent application, Ser. No. 08/246,546, filed May 20, 1994, abandoned.

FIELD OF THE INVENTION

This invention is directed to a system for fluidizing a dense phase bed of solid particles. In particular, this invention is to a system for fluidizing a dense phase bed of solid catalyst particles.

BACKGROUND OF THE INVENTION

Fluidization is typically observed when a dense phase bed of solid particles comes in contact with a vertical upward fluid flow, in an intermediate range of flow rates. At low flow rates or velocities, the solid particles lie on one another in a dense phase state. At high low rates or velocities, the solid particles are conveyed upward and out of a vertical column. This is known as hydraulic or pneumatic transport. At intermediate flow or velocity ranges, each particle becomes individually suspended in the fluid as it flows past the particles. On the whole, the bed of solid particles remains motionless relative to the walls of the vertical column. This bed is considered to be fluidized.

A typical system for fluidizing solid particles uses a cylindrical vertical column. Prior to fluidization, a surface of the dense phase bed of solid rests against a fluid permeable support which is affixed to the vertical column. Fluidization is initiated by flowing either a liquid or vapor fluid into the vertical column below the fluid permeable dense phase bed support. The permeable dense phase bed support acts as a distributor as the flowing fluid passes through the support, and the fluid is directed to evenly contact the supported surface of the dense phase bed. After contacting the supported dense phase bed surface, the fluid flows through the entire dense phase bed where the fluid comes into contact with the upper surface of the bed. As the fluid contacts the upper surface, fluidization of the dense phase bed begins. In essence, fluidization in such a column is the result of the flowing fluid pushing the solid particles away from the dense phase portion of the bed. Fluidization itself is actually initiated only after the flowing fluid has passed through the entire dense phase bed.

Various commercial fluidization systems are described by Squires et al., "Fluidized Beds: At Last, Challenging Two Entrenched Practices", *Science*, 1985, 230, 1329–1337. Squires demonstrates that the typical fluidization systems follow either the "German" practice for treating course solids or the "American" practice for dealing with fine powders.

A problem with the typical dense phase system is that the fluid which initially contacts the dense phase bed must flow completely through the dense phase bed before fluidization begins. This type of system requires a rather lengthy amount of time to reach steady state conditions in which an entire dense phase bed of solids becomes continuously fluidized. Such a system is not desirable, for example, when the solids are catalyst particles, and it is desirable to quickly reach fluidized steady state reaction conditions.

SUMMARY OF THE INVENTION

The present invention overcomes many of the problems inherent in the prior art by providing a solids fluidization system which comprises a dense bed solids housing; a dense bed solids support within the dense bed solids housing; fluid injection means aligned annularly within the dense bed solids housing, wherein one end of the fluid injection means has a fluid inlet means for connecting to a fluid supply and another end of the fluid injection means has a fluid outlet means positioned at a distance from the dense bed solids support for sending fluid through the fluid injection means and toward the dense bed solids support at conditions sufficient to fluidize a dense bed of solids; and means for decreasing the distance between the dense bed solids support and the fluid outlet means as fluid is sent through the fluid injection means.

In a preferred embodiment, the means for decreasing the distance between the dense bed solids support and the fluid outlet means comprises means for moving the fluid injection means. Alternatively, the means for decreasing the distance between the dense bed solids support and the fluid outlet means comprises means for moving the dense bed solids support.

In another preferred embodiment, the fluid injection means has means for controlling backmixing of fluidized solids. Preferably, the fluid injection means has means defined by spiral grooves for controlling backmixing of fluidized solids. Alternatively, the fluid injection means has baffle means for controlling backmixing of fluidized solids.

In yet another preferred embodiment, the dense bed solids housing has means for controlling backmixing of fluidized solids. Preferably, the dense bed solids housing has baffle means for controlling backmixing of fluidized solids.

In still another preferred embodiment, the fluid outlet means comprises means for increasing the velocity of fluid flowing throughout the fluid injection means.

BRIEF DESCRIPTION OF THE DRAWINGS

The present invention will be better understood by reference to the Detailed Description of the Invention when taken together with the drawings, wherein.

DETAILED DESCRIPTION OF THE INVENTION

Figure 1:
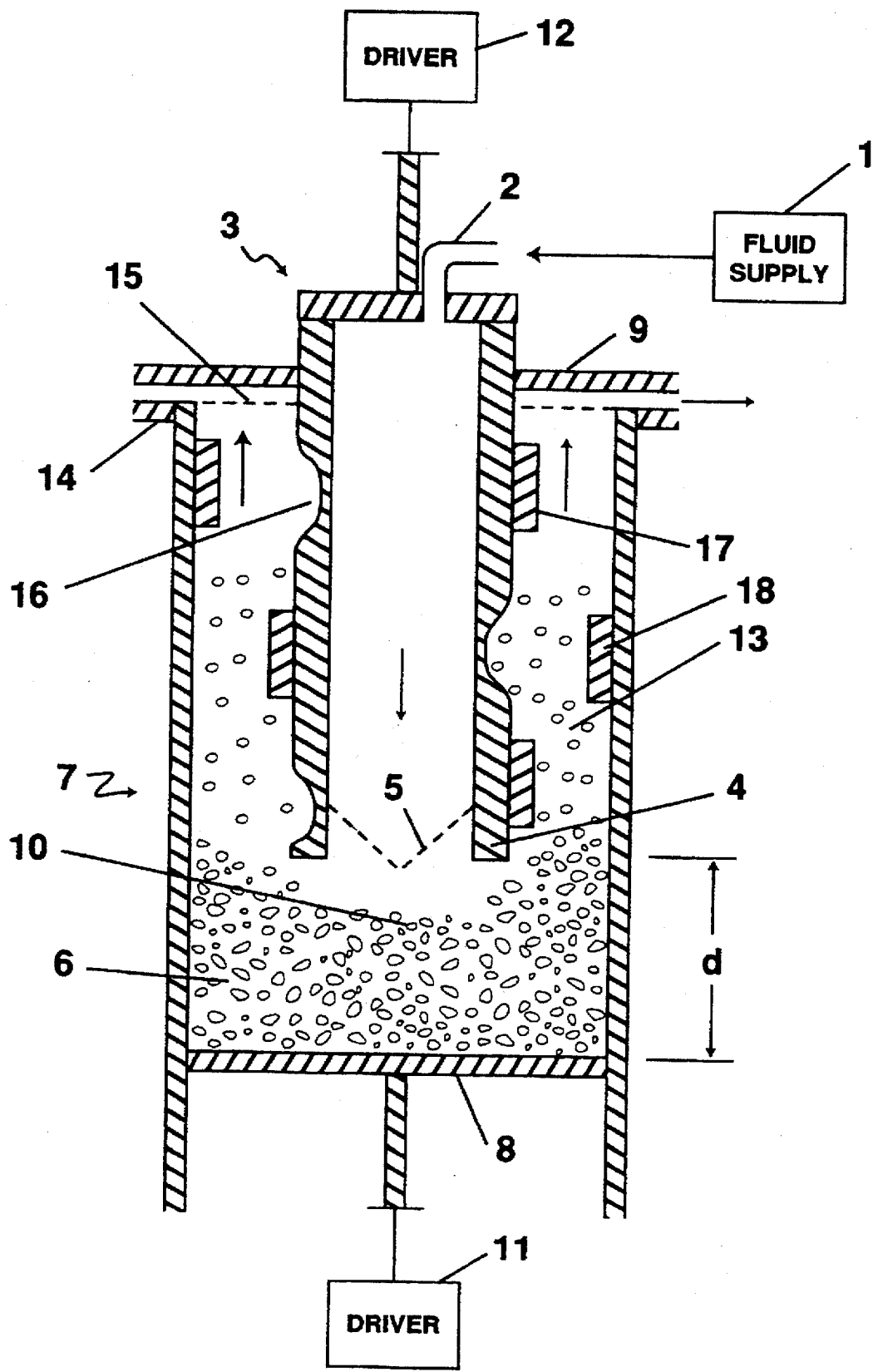
FIG. 1 shows a section view of a preferred embodiment of the solids fluidization system.

It has been found that a dense phase bed of solid particles can be advantageously fluidized by continuously contacting a surface of the dense phase bed with a flowing fluid under conditions sufficient to expand the contacted surface of the dense phase bed of solid particles into a fluidized bed of solid particles. By expanding the dense phase bed of solid particles at the surface where it is initially contacted, fluidization begins almost immediately. An advantage in the almost immediate fluidization of solid particles is that steady state conditions are achieved in an extremely short period of time. This is particularly advantageous when the solid particles are catalyst particles and the fluid which contacts the surface of the dense phase bed is a reaction medium.

According to this invention, the dense phase bed of solid particles is a volume of solid particles being acted upon only by the forces of gravity and a means of support. In this state, the density of the entire volume of particles is the density of the solid material. Preferably, the dense phase bed of solid particles solid material has a density of less than 1.4 g/cm$^3$.

The particles can be any shape, but are preferably spherical and of sufficient diameter so that there is a relatively smooth transition to the fluidized state. Preferably the particles will have an average diameter of 20–500 microns, more preferably 30–150 microns.

A fluidized bed of solids is formed when a given volume of solids is acted upon by a fluid and the density of the given volume is decreased as a result of the fluid displacing a portion of the solids within the volume. In essence, the fluidized bed of solids is formed when a dense phase bed of solids is converted to a dilute phase region comprising solids and fluid. Preferably, the fluidized bed has a density that is between the density of the fluid component and the solids component. It is more preferred that the fluidized bed have a density of 200–3000 kg/m$^3$, most preferably 400–2000 kg/m$^3$.

The solid particles can be made of an inert material or the material can be catalytic in nature. The particles can also be used as a solid support for a catalyst material, and the catalyst material can be imbedded into or adsorbed on the solid support.

Examples of inert and catalytic materials which can be used as solid particles include aluminum oxides, oxyhydroxides, hydroxides, silicon oxides, aluminosilicates, clays, zeolites, tectosilicates, phyllosilicates, metals supported on any of the aforementioned particles, metal sulfides, ceramics including oxides, nitrides and carbides, organic and inorganic polymers, and ceramic/metal composites.

Examples of catalyst compounds which can be imbedded into or adsorbed on the solid support particles include colloidal particles of aluminum oxides, oxyhydroxides, hydroxides, silicon oxides, aluminosilicates, clays, zeolites, tectosilicates, phyllosilicates, dispersed metals, metal oxides or sulfides, ceramics including oxides, nitrides and carbides, organic and inorganic polymers, ceramic/metal composites, proteins and nucleic acids.

The fluid which is used to achieve fluidization according to this invention is any fluid that is capable of freely flowing in a continuous state, and which can flow under conditions which will suspend the solid particles in the fluid as the fluid flows past the suspended particles. The flowing fluid can be a liquid or a vapor. Preferably the flowing fluid is a vapor, more preferably a vapor which acts as a reaction medium.

Examples of liquid materials which are preferred to fluidize the dense phase solids bed in this invention include water, hydrocarbons of molecular weight ranges from methane to materials boiling in excess of 1200° F., emulsions of hydrocarbons and water, emulsions of immiscible hydrocarbons, foams in which the continuous phase is hydrocarbon and the discontinuous phase is air, carbon dioxide, nitrogen or gaseous hydrocarbon.

Examples of vapor materials which are preferred to fluidize the dense phase solids bed in this invention include the noble gases, diatomic gases including hydrogen, nitrogen and oxygen, water, hydrogen sulfide, ammonia, hydrocarbons including compounds with oxygen, nitrogen, sulfur and arsenic, and aerosols containing liquid or solid particles of the aforementioned hydrocarbons suspended in a gaseous phase.

It is preferable in this invention that the flowing fluid stream be supplied to an enclosed volume in a downward direction. In this manner, the dense phase bed can be supported within the closed volume using a minimal amount of support structure, and the flowing fluid can contact the upper surface of the dense phase bed.

The fluid stream should contact the surface of the dense phase bed under conditions which are sufficient to expand the solid particles into a fluidized state. The conditions include several variables acting at once, and fluidization can be achieved according to the parameters understood by those of ordinary skill in the art. See, e.g., *Fluidization*, Second Edition, Davidson et al., Eds., Academic Press, 1985, particularly pages 1–44, which are incorporated herein by reference, and which describe the relevant relationships between pressure, density, velocity and bed height which should be taken into consideration in order to obtain the desirable momentum balance. See also, Geldart, "Types of Gas Fluidization", *Powder Technology*, 1973, 7, pages 285–292 being incorporated herein by reference, who points out that under certain conditions a plug of moving catalyst can be formed prior to fluidization.

According to this invention, once fluidization of the dense phase bed surface begins, the fluid stream is fed continuously into the dense phase bed so that fluidization is continued until at least a desirable portion of the solid particles in the dense phase bed is expanded to a fluidized state within the enclosed volume. The extent to which a dense phase bed is fluidized is determined by the needs of the user. For example, if it is desirable to run a catalytic reaction, with the solid particles serving as the catalyst and the fluid stream serving as the reaction medium, the parameters contributing to fluidization are controlled by the quantity of product desired.

After the flowing fluid stream has contacted the dense phase bed surface, the flowing fluid is controlled to flow in a direction which is opposite to that of the flowing fluid stream prior to contacting the dense phase bed. From a practical standpoint, it is preferable that the flowing fluid contact the dense phase in a downward direction to affect fluidization, and that the fluid be directed upwardly after contact with the dense phase bed for collection. These steps of directing fluid flow ensure that the flowing fluid stream does not travel through the entire dense phase bed, thereby delaying initiation of the fluidization process.

It is to be understood that the terms "upward" and "downward" are used to describe a relative comparison of directional movement. The terms should not be considered to be exactly defining of movement of fluid flow at specific angular orientation or at any specific instant in time or to be precisely representative of any time derived fluid flow profile. Instead, these terms should be taken to provide an overall understanding of the entire mass flow of the fluid, as it will be appreciated that certain flow regimes, e.g., backflow and turbulent flow regimes, which do occur in the flow regimes of this invention, are not intended to be accounted for in the overall concept of the invention.

The overall concept of this invention can be better explained with reference to FIG. 1, which is a section view of a preferred embodiment of the invention. As shown in FIG. 1, a flowing fluid stream is supplied from a fluid supply 1 to an inlet conduit 2 of a fluid injection means 3. The fluid can be a liquid or vapor and is transported under pressure from the fluid supply 1, which includes a pump or compressor for transporting the fluid under pressure.

The flowing fluid stream passes through the fluid injection means 3, leaving the fluid injection means 3 by way of a fluid outlet means 4. As shown in FIG. 1, the fluid outlet means 4 preferably includes a velocity increasing means 5 for increasing the velocity of the fluid flowing out of the fluid injection means 3.

The fluid is sent from the outlet means 4 toward a dense bed of solid particles 6 which is maintained within a dense bed solids housing 7. The dense bed solids housing includes a dense bed solids support 8 and a cover 9.

As the fluid contacts the surface 10 of the dense bed of solids particles 6, fluidization begins. The subsurface portion of dense bed of solids particles is fluidized by continuously directing the flowing fluid stream into the dense bed. By continuously directing the flowing fluid stream into the dense bed, it is meant that the distance, d, between the fluid outlet means 4 and the dense bed solids support 8 is continuously decreased at a rate which promotes fluidization of the dense bed. Preferably, the distance d is continuously decreased by moving the dense bed solids support 8 toward the outlet means 4 using a driver 11, with the fluid outlet means 4 being held stationary. Alternatively, the dense bed solids support 8 is held stationary, and the fluid outlet means 4 is moved toward the dense bed solids support 8 using a driver 12. In yet another alternative embodiment, both the dense bed solids support 8 and the fluid outlet means 4 are moved toward another at the same time by drivers 11 and 12.

In order to quickly and efficiently achieve the fluidized state, the flowing fluid is directed to flow away from the dense phase bed of solid particles 6 after contact with the surface 10. As shown in FIG. 1, the flowing fluid is preferably directed to flow in an upward direction so that fluidization begins upon contact. As the flowing fluid moves in its upward direction, it passes through a fluidized solids region 13 and is collected by a collection means 14. It is desirable to include a vapor permeable screening means 15 to prevent solids from entering the collection means 14 in case of over pressuring or other emergency upsets.

In order to minimize undesirable regions of backmixing of solid particles in the fluidized state, the fluid injection means 3 is annularly aligned within the dense bed solids housing 7. Backmixing is also controlled by adding helical grooves 16 or baffle means 17 to the exterior portion of the fluid injection means 3. Baffle means 18 is also added directly to the dense bed solids housing 7 to minimize backmixing.

Figure 2:
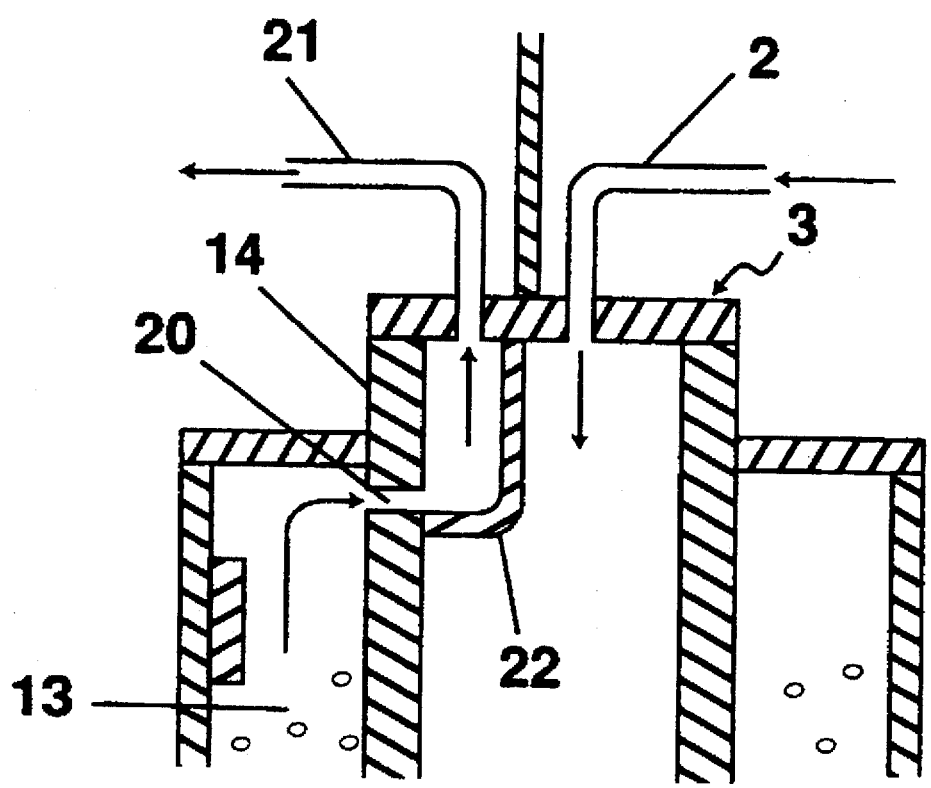
FIG. 2 shows a section view of a preferred embodiment of the solids fluidization system, wherein the fluid injection means contains a fluid collection means.

In another preferred embodiment of the invention shown in FIG. 2, the fluid injection means 3 contains the fluid collection means 14. In this embodiment, the flowing fluid leaves the fluidized solids region 13 through a passageway 20 and is transported out of the system through a conduit 21. The flowing fluid coming into the system is segregated from the flowing fluid leaving the system by a barrier 22.

Figure 3:
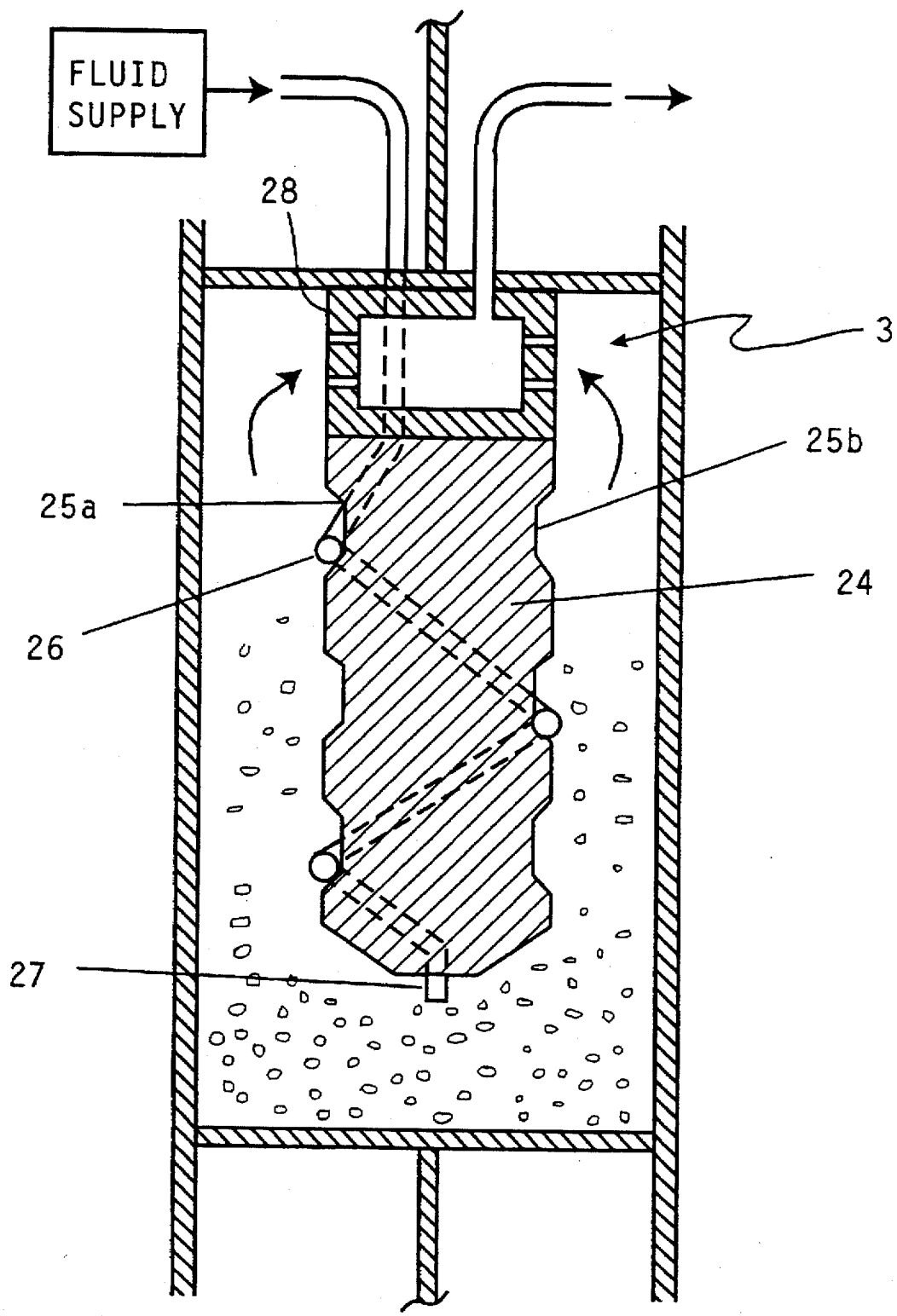
FIG. 3 shows a section view of a preferred embodiment of the solids fluidization system, wherein the fluid injection means includes a solid core and frit.

In FIG. 3, yet another embodiment of the fluid injection means 3 is shown. In this embodiment, the fluid injection means 3 includes a solid core 24. The solid core 24 contains two helical grooves 25a, 25b which traverse along the length of the solid core 24. Within one of the grooves (e.g., helical groove 25a) a conduit 26 is secured for injecting feed from a fluid supply. Feed from the fluid supply traverses in a helical direction within the conduit 26 until the feed emerges from a fluid outlet means 27 to contact the dense bed of solid particles. Fluid that has contacted the dense bed of solid particles is then collected after passing through a frit 28, which forms an upper portion of the fluid injection means 3.

If desired, thermocouples or other conduits can be mounted within one of the helical grooves 25a, 25b. Preferably, thermocouples and a quench gas conduit are mounted along side conduit 26 in helical groove 25a. This leaves helical groove 25b to effectively control backmixing.

Figure 4:
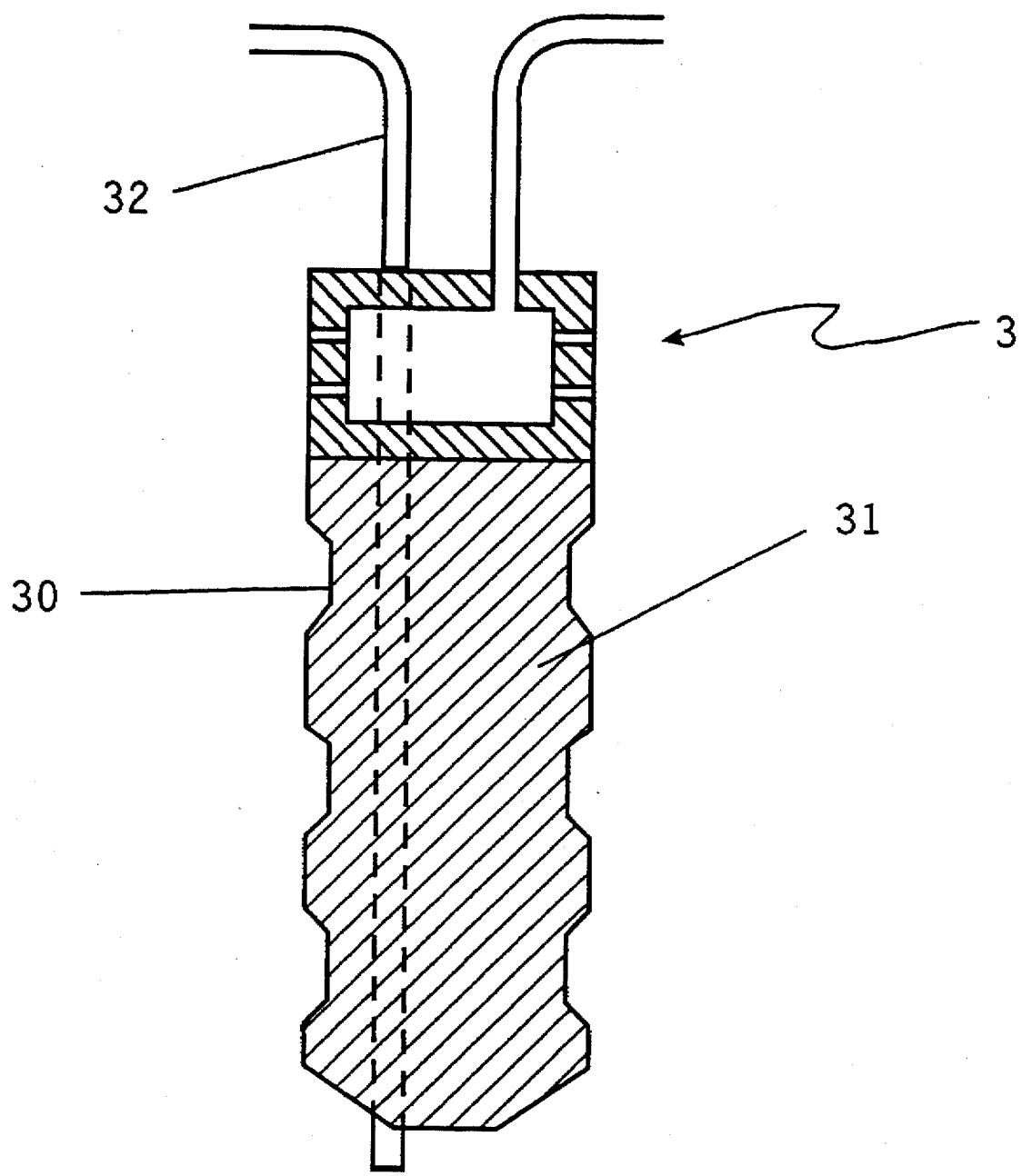
FIG. 4 shows a section view of a preferred embodiment of the solids fluidization system, wherein a feed conduit is fitted to the fluid injection means by way of groove which is cut lengthwise along a solid core pore portion of the fluid injection means.

The fluid injection means 3 is shown in another embodiment in FIG. 4. In this embodiment, at least one helical groove 30 traverses along the length of a solid core 31. In this embodiment, a conduit 32 is secured to the fluid injection means 3 for injecting feed from a fluid supply. The conduit 32 is fitted to the fluid injection means 3 by way of a groove which is cut in a lengthwise fashion along the solid core 31. In FIG. 4 the groove and conduit 32 are shown behind the section line through injection means 3.

Having now fully described this invention, it will be appreciated by those skilled in the art that the invention can be performed within a wide range of parameters within what is claimed.

What is claimed is:

1. A solids fluidization system comprising
   a dense bed solids housing;
   a dense bed solids support contacting said dense bed solids housing and located within the dense bed solids housing;
   fluid injection means aligned annularly within the dense bed solids housing containing a dense bed of solids, wherein one end of the fluid injection means has a fluid inlet means for connecting to a fluid supply and another end of the fluid injection means has a fluid outlet means positioned above the dense bed of solids at a distance from the dense bed solids support for sending fluid downwardly through the fluid injection means and toward the dense bed solids support at conditions sufficient to fluidize the surface solid particles at the upper surface of the dense bed of solids within the annulus between the fluid injection means and the dense bed solids housing;
   means for decreasing the distance between the dense bed solids support and the fluid outlet means as fluid is sent through the fluid injection means; and
   fluid exit means, said exit means being defined by the dense bed solids housing and the injection means.

2. The solids fluidization system of claim 1, wherein the means for decreasing the distance between the dense bed solids support and the fluid outlet means comprises means for moving the fluid injection means.

3. The solids fluidization system of claim 1, wherein the means for decreasing the distance between the dense bed solids support and the fluid outlet means comprises means for moving the dense bed solids support.

4. The solids fluidization system of claim 1, wherein the fluid injection means has means for controlling backmixing of fluidized solids.

5. The solids fluidization system of claim 4, wherein the means for controlling backmixing of fluidized solids has means defined by helical grooves.

6. The solids fluidization system of claim 4, wherein the means for controlling backmixing of fluidized solids has baffle means.

7. The solids fluidization system of claim 1, wherein the dense bed solids housing has means for controlling backmixing of fluidized solids.

8. The solids fluidization system of claim 7, wherein the dense bed solids housing has baffle means for controlling backmixing of fluidized solids.

9. The solids fluidization system of claim 4, wherein the fluid outlet means comprises means for increasing the velocity of fluid flowing throughout the fluid injection means.

* * * * *